US011611088B2

(12) United States Patent
Miler et al.

(10) Patent No.: US 11,611,088 B2
(45) Date of Patent: Mar. 21, 2023

(54) ELECTRODE ASSEMBLY AND METHOD FOR ITS PREPARATION

(71) Applicant: OXENERGY LTD., Lod (IL)

(72) Inventors: Yisrael Miler, Bat Ayin (IL); Elad Shina, Tel Aviv (IL); Aviel Danino, Ramat Gan (IL); Irena Kobrin, Kiryat Ekron (IL); Omri Feingold, Ramat Gan (IL); Avi Melman, Holon (IL); Joel Lang, Givataim (IL)

(73) Assignee: OXENERGY LTD., Lod (IL)

( * ) Notice: Subject to any disclaimer, the term of this patent is extended or adjusted under 35 U.S.C. 154(b) by 238 days.

(21) Appl. No.: 16/972,082

(22) PCT Filed: Jun. 6, 2019

(86) PCT No.: PCT/IL2019/050643
§ 371 (c)(1),
(2) Date: Dec. 4, 2020

(87) PCT Pub. No.: WO2019/234744
PCT Pub. Date: Dec. 12, 2019

(65) Prior Publication Data
US 2021/0226230 A1 Jul. 22, 2021

Related U.S. Application Data

(60) Provisional application No. 62/681,098, filed on Jun. 6, 2018.

(51) Int. Cl.
*H01M 8/0284* (2016.01)
*H01M 4/86* (2006.01)
(Continued)

(52) U.S. Cl.
CPC ....... *H01M 8/0284* (2013.01); *H01M 4/8605* (2013.01); *H01M 4/8807* (2013.01);
(Continued)

(58) Field of Classification Search
CPC .................................. H01M 12/00–12/085
See application file for complete search history.

(56) References Cited

U.S. PATENT DOCUMENTS

| 3,553,024 A | 1/1971 | Fishman |
| 4,343,869 A | 8/1982 | Oltman et al. |

(Continued)

FOREIGN PATENT DOCUMENTS

| DE | 102014209784 | * 12/2014 |
| WO | 2014057483 A1 | 4/2014 |

OTHER PUBLICATIONS

International Search Report and Written Opinion dated Sep. 11, 2019, issued in International Application No. PCT/IL2019/050643, 12 pages.
(Continued)

*Primary Examiner* — Jonathan Crepeau
(74) *Attorney, Agent, or Firm* — Pearl Cohen Zedek Latzer Baratz LLP (57) ABSTRACT

The invention relates to a metal-air electrochemical cell comprising a frame (100) defining an electrolyte chamber having an anode side and a cathode side, wherein an air cathode assembly is provided in the cathode side, said air cathode assembly (20) comprising hydrophobic porous film having a first face and a second face, with current collector (21) and catalyst-containing active layer (26) provided on said first face, with the planar dimensions of the catalyst-containing active layer on said first face being smaller than that of said hydrophobic film and said current collector, such that the catalyst-containing active layer does not reach the edges of said hydrophobic film and said current collector, thereby creating a catalyst-free margin (27) on the hydrophobic film (31) and current collector which surrounds the catalyst-containing active layer, and wherein said first face of the hydrophobic film and said frame of the cell arm joined (Continued)

together by thermoplastic (101) applied onto the catalyst-free margin of the hydrophobic film. A method of assembling the metal/air cell is also described.

6 Claims, 7 Drawing Sheets

(51) Int. Cl.
*H01M 4/88* (2006.01)
*H01M 8/0232* (2016.01)
*H01M 12/06* (2006.01)

(52) U.S. Cl.
CPC ....... *H01M 4/8878* (2013.01); *H01M 8/0232* (2013.01); *H01M 12/065* (2013.01)

(56) References Cited

U.S. PATENT DOCUMENTS

| | | |
|---|---|---|
| 4,756,980 A | 7/1988 | Niksa et al. |
| 4,925,744 A | 5/1990 | Niksa et al. |
| 8,142,938 B2 | 3/2012 | Khasin et al. |
| 2007/0037058 A1 | 2/2007 | Visco et al. |
| 2007/0077485 A1 | 4/2007 | Takamura et al. |
| 2010/0047666 A1 | 2/2010 | Tatsumi |
| 2011/0039164 A1 | 2/2011 | Akers et al. |
| 2015/0207150 A1 | 7/2015 | Lang et al. |

OTHER PUBLICATIONS

Search Report dated Feb. 1, 2022 for corresponding European Application No. 19816036.8.

\* cited by examiner

ELECTRODE ASSEMBLY AND METHOD FOR ITS PREPARATION

CROSS-REFERENCE TO RELATED APPLICATION(S)

This application is a 35 U.S.C. 371 National Phase Entry Application from PCT/IL2019/050643 filed on Jun. 6, 2019, which claims the benefit of the filing date of U.S. Provisional Application No. 62/681,098 filed on Jun. 6, 2018, the entire contents of which are incorporated herein by reference.

The invention relates to an electrode assembly which is suitable for use, inter alia, as an air cathode in metal/air cells and batteries and in fuel cells containing an alkaline electrolyte.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout. In the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Figure 1:
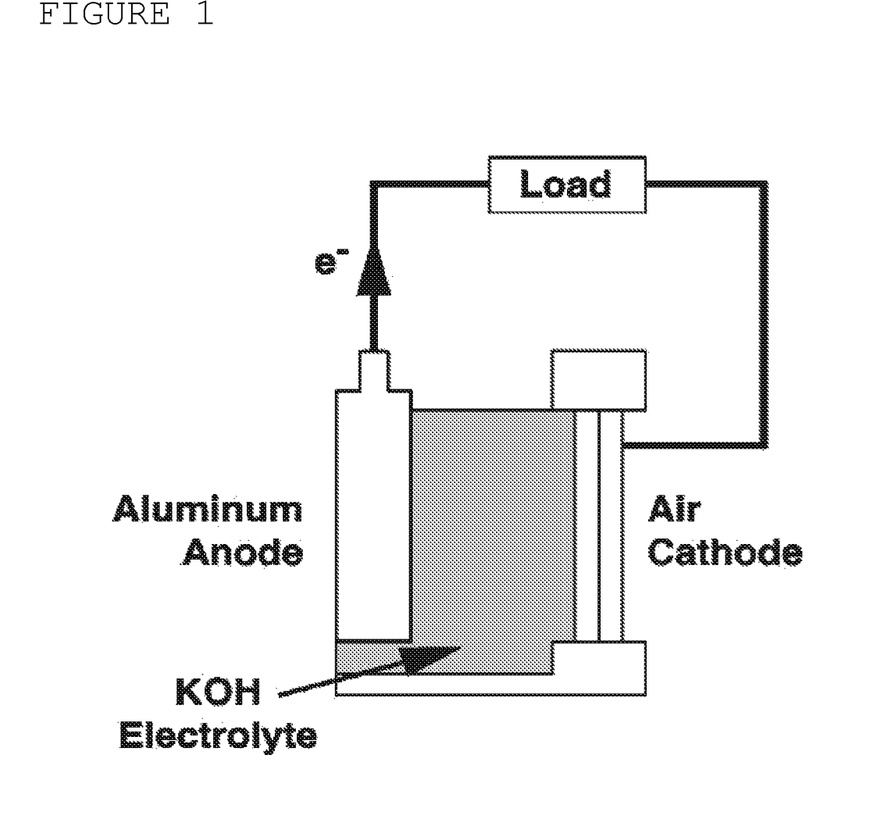
FIG. 1 is a high-level schematic illustration of a configuration of a metal/air cell, according to some embodiments of the invention.

In its most general form, the operation of metal/air electrochemical cell is based on the reduction of atmospheric oxygen, which takes place at the cathode, and the oxidation of metallic anode. The aqueous electrolyte present in the cell is a highly alkaline solution, e.g., highly concentrated potassium hydroxide solution. A typical configuration of a metal/air cell is schematically shown in FIG. 1, in which the air cathode, the consumable metallic anode and the electrolyte are shown.

A commonly used air cathode consists of (i) an electronically conductive screen, an expanded foil or a metallic foam which serves as a current collector, (ii) active electrode particles provided within the current collector (including a catalyst for promoting the reduction of oxygen) and (iii) hydrophobic porous film (polytetrafluoroethylene, abbreviated PTFE, Teflon®) supported on one face of said screen or foil. The hydrophobic PTFE film, which is permeable to air but not to water, faces the exterior of the electrochemical cell whereas the catalytically active layer faces the aqueous electrolyte.

The anode immersed in the electrolyte is made of metals such as aluminum, zinc, magnesium, iron and alloys thereof. When aluminum anode is used, then the cell is a primary cell. That is, on consumption of the aluminum anode, recharging of the cell is done by replacing the spent aluminum anode with a fresh anode. The discharge reaction of an Al-air cell is as follows:

$$4Al + 3O_2 + 6H_2O \rightarrow 4Al(OH)_3$$

The solid aluminum hydroxide which precipitates at the anode side is collected and withdrawn from the cell.

Aluminum-air battery consists of a plurality of individual cells as described above arranged in stacked relationship to form a rectangular parallelepiped structure held together by conventional mechanical means, for example, a plurality of rods extending along each longitudinal opposite sides of the battery and joining support means, e.g., in the form of bulkheads, positioned in the other sides of the battery. The battery is provided with circulation and venting means for exposing the cathode to oxygen atmosphere. Such batteries can serve as power source for electric vehicles. Each individual cell in the battery has a frame defining an electrolyte chamber. The frame is usually molded as one-piece from a material which is chemically inert, that is, able to withstand a strong alkaline environment. Thermoplastic materials such as polypropylene, polyethylene, FEP, PTFE, Noryl and Santoprene are conventionally used in producing these frames. One side of the electrolyte chamber contains an aluminum plate, and the opposite side is sealed by the air cathode. A description of the frame of such cell is given below in reference to FIG. 5.

The present invention resides in the structure of the air cathode and its attachment to the frame of the cell. As mentioned above, an air cathode normally consists of air preamble PTFE film, a catalytically active layer applied onto one face of the PTFE film and a current collector (e.g., a metal screen) embedded in the catalytically active layer. The PTFE film, the active layer and the metal grid correspond in geometric shape and size. For example, U.S. Pat. No. 3,553,024 describes the preparation of a catalytically active material in the form of a paste consisting of platinum black and a binder (colloidal PTFE) which is spread over one face of a PTFE film. A piece of platinum gauze of the same size as the PTFE film is then laid over the coated surface of the PTFE film and pressed into the film. The resultant structure is dried and sintered. That is, a coextensive design is commonly used for air cathodes, i.e., the PTFE film and the catalytically active layer deposited thereon have the same dimensions. A similar coextensive design is also found in U.S. Pat. No. 4,925,744. The air cathode may have a cathode metal frame which in turn is secured to the frame of the cell defining the electrolyte chamber frame.

In co-assigned WO 2014/057483 we reported that the coextensive design is prone to electrolyte leakage. That is, the aqueous electrolyte cannot flow across, and seep through, the PTFE film due to the highly hydrophobic nature of the film. However, electrolyte seepage still occurs because the electrolyte flows downwardly over the internal surface of the PTFE film and leaks through the interface between the film and a mechanical gasket applied on its edges (e.g., an O ring which normally would not adhere well to the film). Electrolyte leakage and electrolyte loss negatively affect the performance of the air cathode and a metal/air cell where the cathode is utilized.

As shown in WO 2014/057483, it is possible to minimize the problem of electrolyte's leakage and achieve stable performance of the air cathode in an air/aluminum cell over long test periods by replacing the coextensive design with a different design. That is, in the air cathode assembly described in WO 2014/057483, the planar dimensions of the catalytically active layer are smaller than that of the PTFE film and the current collector pressed thereto, such that the catalytically active layer does not reach the edges of the PTFE film and current collector.

Figure 2:
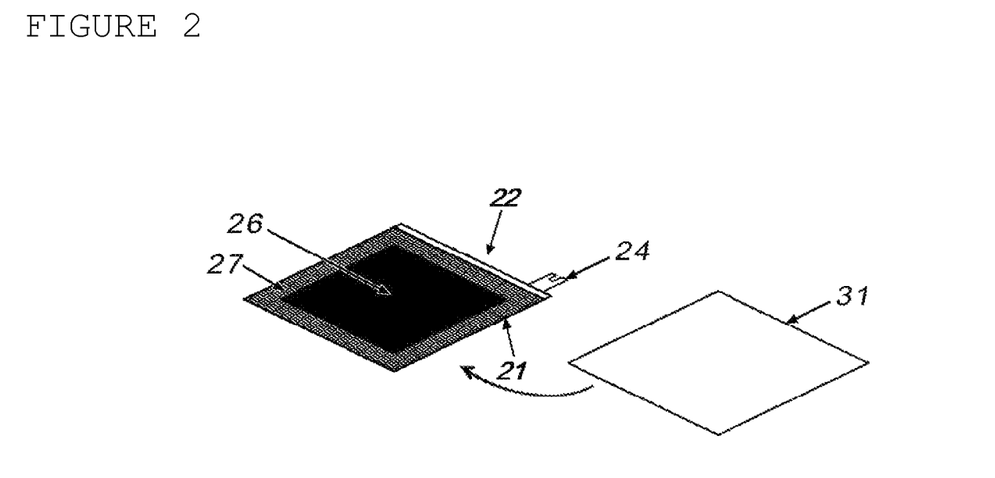
FIG. 2 is a high-level schematic illustration of a cell design, according to some embodiments of the invention.

The design disclosed in WO 2014/057483 is illustrated in FIG. 2. The catalyst-containing active layer and the current collector screen are indicated by numerals 26 and 21, respectively. The PTFE film is represented by numeral 31; the arrow indicates that the PTFE is placed beneath the current collector 21 and the catalyst-containing active layer 26. Numeral 22 is a metal piece joined (e. g., by welding) to one side of the current collector 21 to increase current collection; current is withdrawn through contact tab 24. Owing to the difference in planar dimensions between the catalyst-containing active layer 26 on the one hand, and current collector 21 and PTFE film 31 on the other hand, there exists a margin area 27 of the PTFE film that is catalyst-free. That is, where the screen pressed onto the PTFE film is not covered by catalyst. It was demonstrated in WO 2014/057483 that the porosity of the PTFE film in the catalyst-free margin area 27 can be blocked with the aid of a suitably diluted epoxy formulation which is able to flow into the pores of the PTFE film. On drying and removal of volatile solvents, a narrow sealant-containing boundary layer coating the margin area of the PTFE film is created. The penetration of the sealant into the PTFE film, such that the porosity of the film is partially filled, enables the formation of a good mechanical barrier for electrolyte seepage when the electrode assembly is affixed to the frame of the electrochemical cell placed in aluminum/air battery. Other sealants mentioned in WO 2014/057483 include silicone, polyurethane, acrylates, rubber or rubber-like materials.

We now propose an alternative approach to utilizing the catalyst-free peripheral area of the PTFE film in the air cathode assembly disclosed in WO 2014/057483. The approach is based on causing a molten thermoplastic to flow under exerted pressure into the pores of the PTFE film in the catalyst free area (that is, where the screen is not covered by catalyst) and tightly join the air cathode assembly and the frame of the cell together.

An electrode assembly based on this approach was fabricated using a method described in detail below in reference to FIGS. 4 and 5, to investigate the penetrability of molten thermoplastic—polypropylene—into the pores of a PTFE film (but in order to simplify the procedure, a metallic current collector was not included). The electrode assembly was then cut transversally to expose the cross-section of the PTFE film in the catalyst-free margin area. The exposed lateral side was studied with the aid of scanning electron microscopy (SEM) equipped with energy-dispersive X-ray spectroscopy system (EDX; EDAX) which allows identification of particular elements and their relative proportions (weight or atomic %). For example, the energy of the characteristic lines assigned to carbon and fluorine in EDX spectrum is at ~0.27 keV and 0.67 keV, respectively. We refer to the exposed side as the lateral side of the electrode assembly; assuming that the planar electrode assembly of FIG. 2 lies on the X-Y plane, then the lateral side of the electrode assembly extends over the Y-Z plane.

Figure 3A:
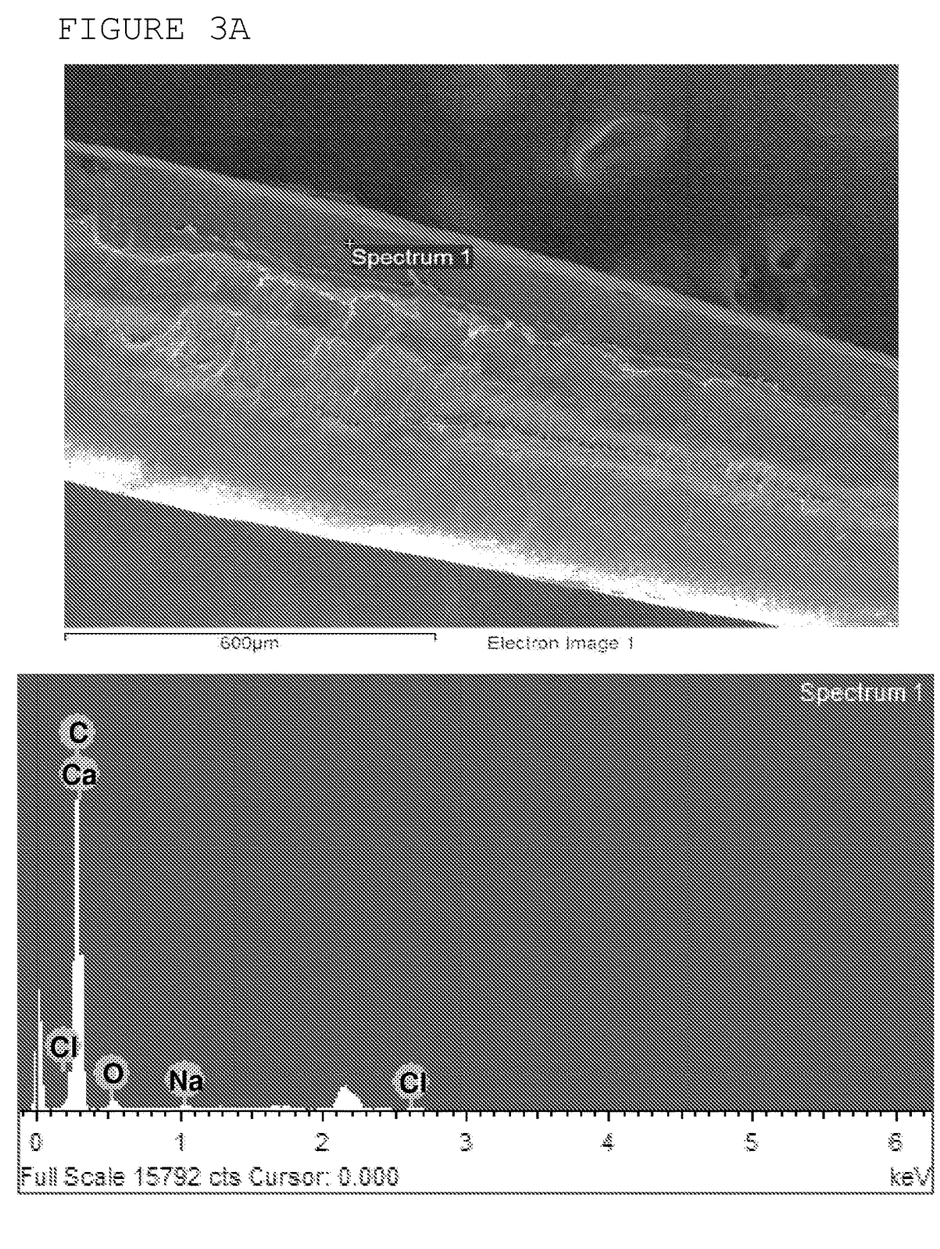
FIGS. 3A-3C include SEM images of the lateral side of the electrode and corresponding EDX spectra named "spectrum 1", "spectrum 2" and "spectrum 3" associated with each of the three distinct layers seen in the SEM image of the PTFE film, according to some embodiments of the invention.
Figure 3B:
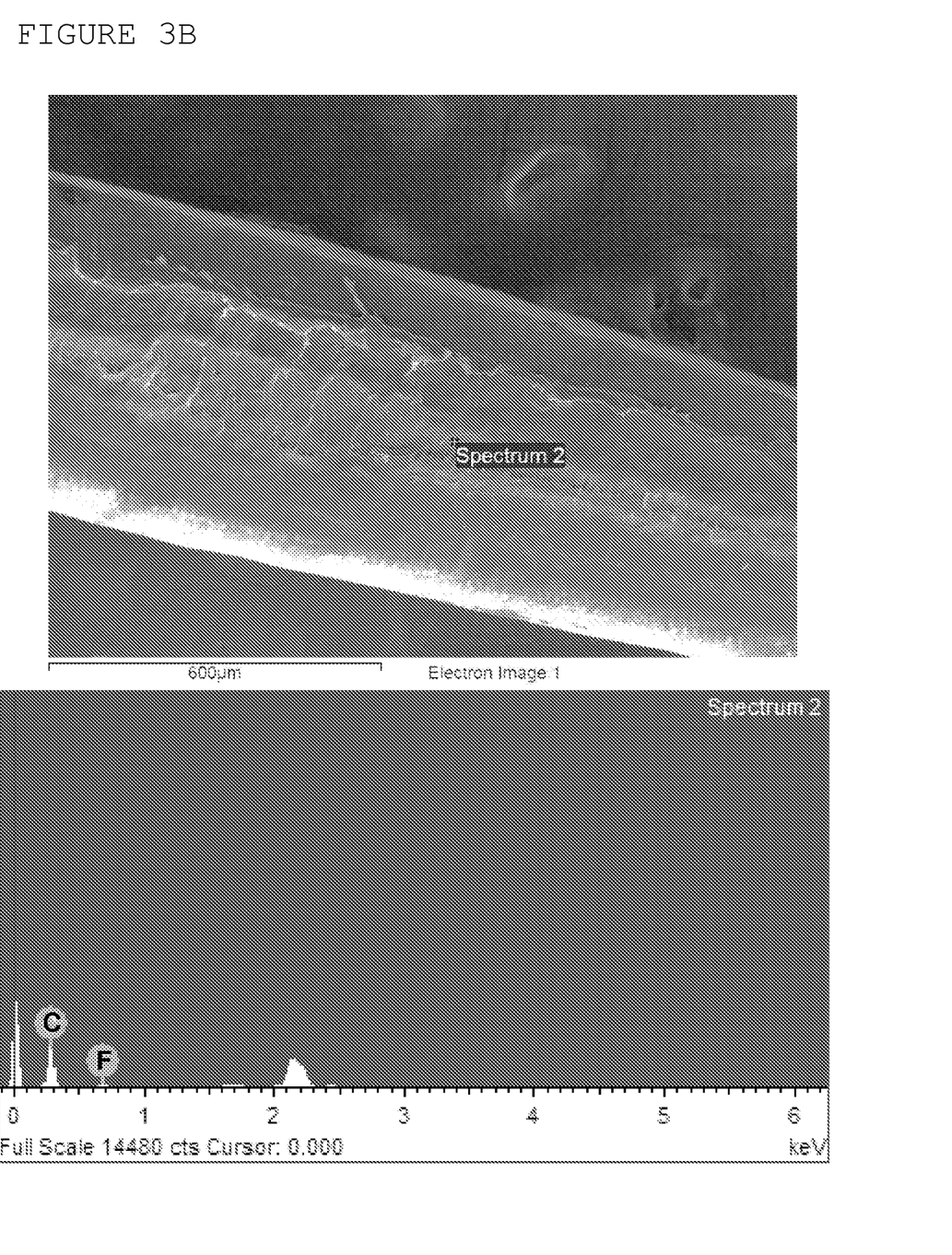
Figure 3C:
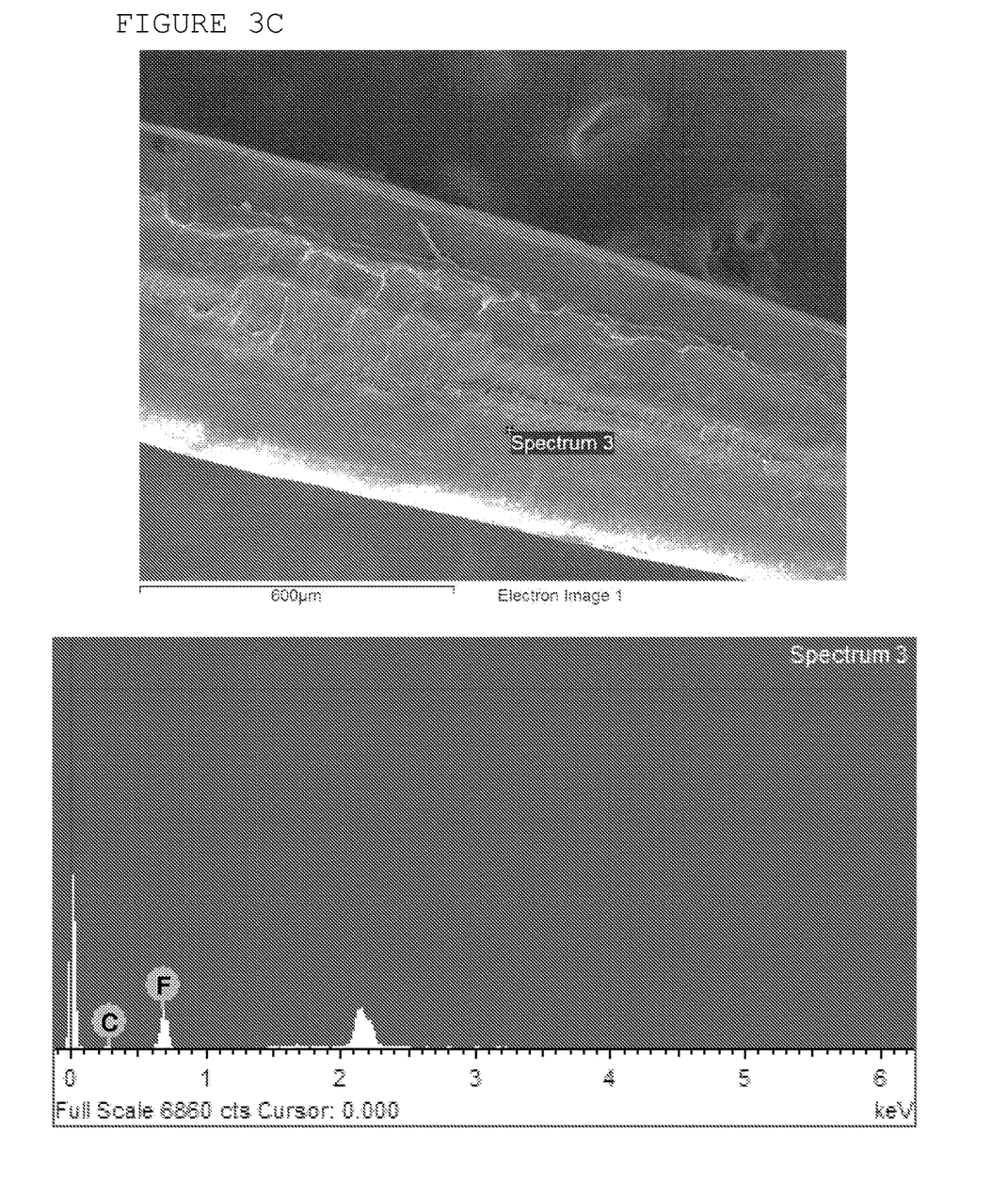

FIGS. 3A, 3B and 3C show SEM images of the lateral side of the electrode and corresponding EDX spectra named "spectrum 1", "spectrum 2" and "spectrum 3" associated with each of the three distinct layers seen in the SEM image of the PTFE film. It is seen that the thickness of the PTFE film is ~500 μm. It should be borne in mind that intact PTFE consists solely of carbon and fluorine atoms (the molecular formula of PTFE is —[$CF_2$—$CF_2$]—$_n$) and that fluorine is the predominant component in terms of weight and atomic %. Hence variation in the relative proportion of carbon and fluorine measured by the EDX analyzer at different points across the thickness of a PTFE film indicates that the PTFE film underwent compositional changes ascribed to the added thermoplastic. That is, high, constant fluorine concentration is indicative of a "natural" PTFE film; zones with reduced fluorine concentration correspond to "mixed" thermoplastic-containing PTFE segments.

Weight and atomic percent concentrations measured with the EDX analyzer for the PTFE film modified according to the invention are tabulated in Table 1.

TABLE 1

| element | Top layer (spectrum 1) | | Intermediate layer (spectrum 2) | | Lowermost layer (spectrum 3) | |
| --- | --- | --- | --- | --- | --- | --- |
| | weight % | atomic % | weight % | atomic % | weight % | atomic % |
| C | 88.66 | 91.67 | 85.02 | 89.98 | 13.57 | 19.90 |
| F | Not detected | | 14.98 | 10.02 | 86.43 | 80.10 |
| total | * | * | 100 | 100 | 100 | 100 |

* other elements in addition to carbon were detected, chiefly oxygen

It is seen from the results set out in Table 1 that no fluorine is detected in the top layer which corresponds to the polypropylene coating applied onto the catalyst-free margins of the PTFE film. Conversely, the composition of the lowermost layer is in perfectly line with intact PTFE, with fluorine and carbon being the major and minor elements, respectively. The intermediate layer exhibits a hybrid character: fluorine is detected, albeit as a minor component, owing to the fusion of the polypropylene within the pores of the PTFE film leading to a significant increase in the amount of carbon in the intermediate layer. The intermediate layer accounts for the good barrier created to minimize electrolyte seepage.

Figure 3D:
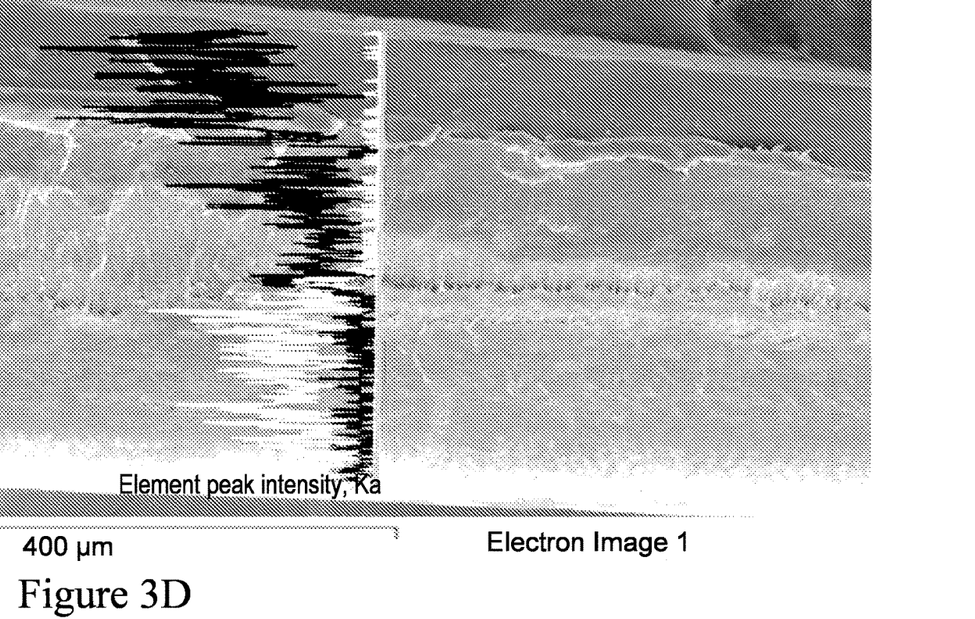
FIGS. 3D and 3E provide a cross section image of the PTFE film and a graph of carbon and fluorine peak intensities plotted versus the position along the lateral side of the PTFE film, according to some embodiments of the invention.
Figure 3E:
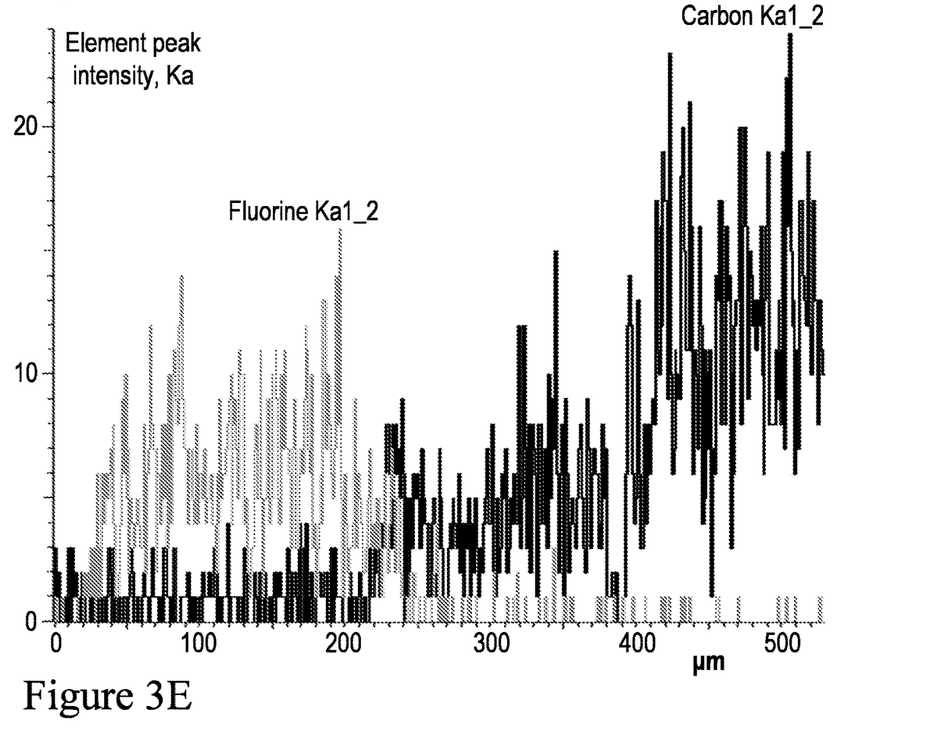

The results are also shown in FIGS. 3D and 3E, with the aid of a graph where carbon and fluorine peak intensities are plotted versus position along the lateral side of the PTFE film. The intermediate layer where both carbon and fluorine are detected as major and minor components, respectively, is clearly seen; increasing carbon and decreasing fluorine content (blue and red, respectively), moving from lowermost layer to top layer.

Accordingly, the invention is primarily directed to an electrode assembly comprising PTFE film having a first face and a second face, with current collector and catalyst-containing active layer provided on said first face, with the planar dimensions of the catalyst-containing active layer being smaller than that of the PTFE film and the current collector, such that the catalyst-containing active layer does not reach the edges of the PTFE film and current collector, thereby creating a catalyst-free margin on the PTFE film which surrounds the catalyst-containing active layer, wherein a thermoplastic is applied onto said first face in the catalyst-free margin area, and wherein EDX spectroscopy indicates variation in the relative proportion between fluorine and carbon across the thickness of the PTFE film in said catalyst-free margin, identifying segments where carbon and fluorine are the major and minors elements, respectively; said segments typically lacking other elements such as oxygen. These "hybrid" segments typically lie at a distance of from 0 to 100 μm measured from the first ("internal") face of the PTFE film.

The invention is also directed to a metal-air electrochemical cell comprising a frame defining an electrolyte chamber having an anode side and a cathode side, wherein an air cathode assembly is provided in the cathode side, said air cathode assembly comprising hydrophobic porous film (especially PTFE) having a first face and a second face, with current collector and catalyst-containing active layer provided on said first face, with the planar dimensions of the catalyst-containing active layer on said first face being smaller than that of said hydrophobic film and said current collector, such that the catalyst-containing active layer does not reach the edges of said hydrophobic film and said current collector, thereby creating a catalyst-free margin on the hydrophobic film and current collector which surrounds the catalyst-containing active layer, and wherein said first face of the hydrophobic film and said frame of the cell are joined together (i.e., welded) by thermoplastic applied onto the catalyst-free margin of the hydrophobic film.

The thermoplastic (e.g., one or more polyolefins, especially polypropylene) coats the mesh current collector and/or penetrates to the pores of the hydrophobic film in the catalyst-free margin of the air cathode. For hydrophobic film made of PTFE, information gleaned from EDX spectroscopy as described above could be used to indicate the presence of the thermoplastic in the pores of the PTFE film, by assessing the variation in the relative proportion between fluorine and carbon across the thickness of the PTFE film in the catalyst-free area of the air cathode welded to the cell frame.

In a variant of the invention, the thermoplastic applied onto the catalyst-free margin of the hydrophobic film comprises a major polymer and a secondary polymer, e.g., polypropylene and a second polyolefin, respectively. As illustrated below in reference to the fabrication of the cell, we have found that it is beneficial to use a combination of (i) polypropylene as major thermoplastic (it creates a strong mechanical welding on account of its ability to penetrate—in a molten state, under exerted pressure—to the pores of the PTFE film, and (ii) a second polyolefin with suitable flowability and melt viscosity (to provide an additional leak proof barrier).

The invention additionally provides a metal-air battery comprising a plurality of individual cells as described above, mounted in an array.

The fabrication of the electrode assembly is now described with reference to the appended drawings. FIG. 4 illustrates the production of an air cathode with the design disclosed in of WO 2014/057483 (FIG. 4 is based on FIG. 5 of WO 2014/057483 with the omission of the last step—epoxy addition—which has been modified by the present invention). FIG. 5 is then provided to demonstrate an elegant method for utilizing a thermoplastic in lieu of epoxy sealant to minimize electrolyte leakage from the cell. Accordingly, the invention provides a method for assembling a metal/air cell, comprising the steps of:

(i) providing an air cathode assembly that comprises hydrophobic porous film having a first face and a second face, with current collector and catalyst-containing active layer provided on said first face, with the planar dimensions of the catalyst-containing active layer being smaller than that of the said film and said current collector, such that the catalyst-containing active layer does not reach the edges of said film and said current collector, thereby creating a catalyst-free margin on the film and current collector which surrounds the catalyst-containing active layer [the width of said margin ($W_{margin}$) is preferably between 1 and 10 mm, e.g., around 3 to 8 mm];

(ii) placing said cathode assembly atop of a cell frame defining an electrolyte chamber, with a thermoplastic body that is capable of softening to a mobile, flowable state upon heating to an elevated temperature (e.g., in the range from 120 to 280° C.) being positioned between said cell frame and said cathode assembly, wherein the thermoplastic body coincides in geometrical shape and position with said catalyst-free margin area and essentially coincides also in width with said catalyst free-margin [the width of said raised thermoplastic region ($W_{thermopslatic}$) is generally slightly smaller than the width of said catalyst free-margin; for example, $W_{thermoplastic}+0.1-3.0$ mm=$W_{margin}$]; and (iii) applying heat and pressure to soften the thermoplastic body and forcing it to flow in the direction of the pores in the catalyst-free margin of the hydrophobic film, thereby welding the air cathode assembly and the frame of the cell upon solidification of the melt.

The hydrophobic porous film is preferably PTFE film (including PTFE layer, e.g., formed by spraying an ink formulation, drying and pressing) or gas diffusion layer (GDL) membrane.

The thermoplastic body is preferably made of polypropylene, and preferably provided as a raised region of the cell frame, i.e., in the form of a thin, 1-4 mm high wall, that protrudes from the surface of the frame and forms an integral part of the frame. As noted above, the geometrical shape of the thermoplastic raised region matches that of the catalyst-free area in the air cathode. On melting the raised region of the cell frame, the thermoplastic flows in the direction of the catalyst-free area in the cathode assembly, to weld the two parts (frame and air cathode).

The fabrication method preferably includes a step of applying a secondary polymer e.g., hot melt polyolefin (e.g., as beads) onto the surface of the cell frame, adjacent to, and in outward direction from, the raised region of the cell frame, such that the hot melt polyolefin encircles the raised region. This combination, consisting of a major thermoplastic and secondary hot melt polyolefin, creates a strong mechanical welding along with an additional leak proof barrier.

It is also possible to preheat the cathode assembly prior to welding step.

Figure 4:
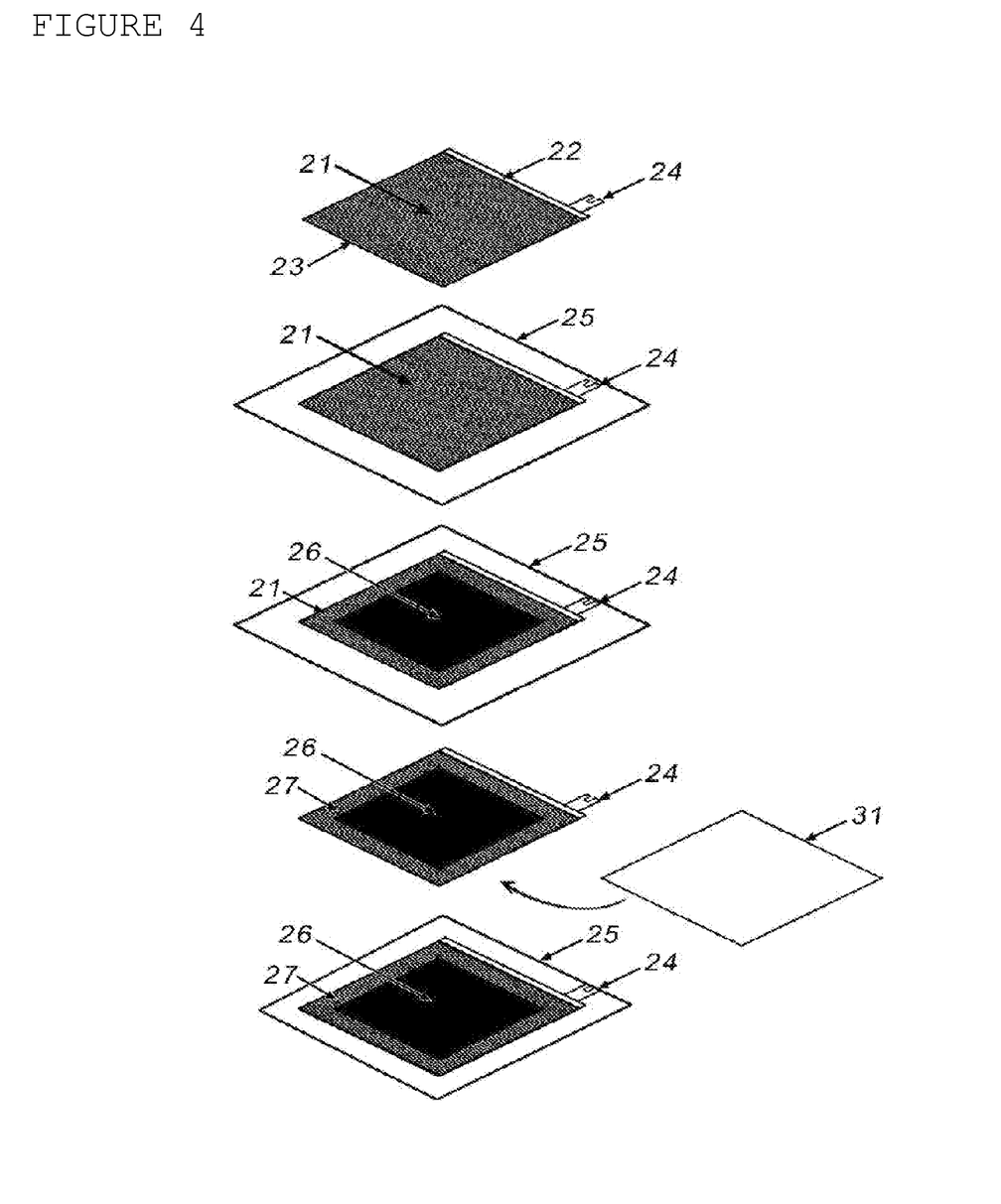
FIG. 4 is a high-level schematic illustration of the production of an air cathode, according to some embodiments of the invention.

Starting with FIG. 4, a rectangular or square metal screen (21) with one solid metal piece (22) attached to one side of the screen is used as a current collector (23). Other shapes are also suitable, as explained below. Screen (21) is made of a metal selected from the group consisting of nickel, nickel plated copper, stainless steel, tin, bismuth, silver and alloys thereof, with nickel being especially preferred. The mesh size is from 10 to 500 mesh, and its thickness is from 20 μm to 500 μm. Suitable screens are available in the market, e.g., from Gerard Daniel Worldwide, such as nickel grids with 70-75 μm wire diameter and 200 μm mesh opening. Other choices for the current collector include (i) expanded foil, which results from a process in which perforations are formed in a metallic foil, following which said perforations are mechanically expanded (e.g., expanded foil from Dexmet Corporation (5Ni5-050P) and (ii) foam, which is a three dimensional, porous structure of a certain type of metal. Regardless of its specific shape, the current collector is sometimes referred to herein, for the purpose of simplicity, as a "mesh", "grid" or "screen".

In the embodiment illustrated in FIG. 4, the solid metal piece (22) corresponds in length to the grid dimension and is also provided with a contact tab (24). The role of element (22) is to increase current collection. It is preferably made of copper, nickel, or nickel plated copper, and its thickness is between 25 μm and 3 mm. It is seen that only one side of the grid is modified with piece (22) for improving current collection but is should be understood that additional sides may be similarly modified. For example, the current collector may be provided by a highly conductive metal frame whose open area essentially corresponds in shape and size to the mesh (21). In such a case, the outer dimensions of the frame are approximately (3 to 40 cm)×(3 to 40 cm) and the inner dimensions of the frame are slightly smaller, e.g. the inner dimension is about 0.5-2 cm shorter than the outer dimension. The attachment of mesh (21) to one or more pieces (22), or to a complete frame, can be achieved by the methods described in WO 2014/057483, e.g. with the aid of conductive adhesive materials (e.g., a conductive epoxy) or welding (e.g., point welding, laser welding, ultrasonic welding or solder welding), to form the current collector. Suitable techniques are applied to ensure low electrical resistance and multiple flow paths for the electrical current; for example when point welding is applied, the welding must be made at a sufficient number of points. Preferably, mesh (21) is made of nickel and the conductive metal piece (22) (or a full frame) is made of nickel-plated copper, with the thickness of the nickel plating provided on the copper frame being from 1 to 50 μm.

Numeral (25) in FIG. 2 indicates a "tray" used in the printing step, as described further below. The current collector (23) is laid over the "tray" and a printable composition comprising a catalyst utilizable in oxygen reduction reaction and a binder, is applied over the central region of the metal grid current collector to form the catalytically active layer (26). Preferred printable compositions used to create the catalytically active layer are described below. It is noted that the margin area (27) of the metal grid current collector is free of the catalytically active material. The catalyst-free margin area (27) which surrounds the catalytically active layer (26), i.e., the gap between the edges of the current collector and the central area filled with the active material, is between 1 and 14 mm wide. More, preferably, the width of marginal area (27) is between 1 and 10 mm, e.g., around 3 to 8 mm.

The catalyst-free margin area of the metal grid is coated with a binder (e.g., FEP), following which a porous hydrophobic PTFE film (31), which is preferably slightly larger than the metal grid (21), is attached to the metal grid and pressure is applied on the structure to achieve good contact between the hydrophobic film (31) and the active catalytic layer (26). PTFE film with thickness ranging from 10 to 400 microns, commercially available from Saint Gobain or Gore can be used.

It should be noted that a different order of steps may be employed (not shown in FIG. 4), e.g., a layer of the catalyst composition (26) can first be printed on the PTFE film (31), and then the metal grid current collector (23) is pressed into the coated PTFE film. Irrespective of the order of steps, the resultant structure consisting of the PTFE film, the catalytically active layer and the current collector is then heat treated, i.e., oven-sintered at about 240 to 320° C. for about 1 to 60 minutes.

The application of the catalytically active layer (26) onto mesh (21) is now described in more detail. As pointed out above, the catalytically active layer (26) is preferably printed as set out in detail in WO 2014/057483. As an alternative to printing techniques, the catalyst composition consisting of the catalytically active particles and a binder can be formulated into a paste which may be directly spread over the central area of the hydrophobic film by any convenient technique, or the catalyst and the binder may be applied in the form of a dispersion that can be sprayed onto the film, following which the metal grid current collector is pressed onto the coated film. The structure is then heat treated.

Turning back to describing the printing technique, a printable composition suitable for use according to the invention is prepared by thoroughly mixing the catalyst particles together with one or more binders, in an aqueous or in an organic carrier (e.g., in a water-miscible alcohol), or in a mixture thereof. As used herein, the term "printable composition" refers to a mixture exhibiting the necessary physical properties, e.g., flowability and thixotropicity for application in printing techniques, such as screen-printing, stencil-printing, inkjet printing and roller-coating.

The concentration of the catalyst in the printable composition of the invention is preferably not less than 1%, e.g., from 5% to 80% (w/w). Catalysts operable in the process of the invention include (but not limited to) silver particles, such as the silver powder associated with zirconium oxide disclosed in U.S. Pat. No. 8,142,938. The properties of this particular type of silver particles are follows: the average primary particle size is from 40 to 60 nm; the average agglomerate size is from 1 to 25 μm; the average agglomerate porosity is about 38 to 45%, the zirconium oxide content is from 0.2 to 4% (w/w) and the specific surface area is from 4 to 10 m$^2$/g. The particles are highly pure, namely, the silver and $ZrO_2$ content is not less than 99.9%.

Other suitable catalysts for promoting oxygen reduction include platinum, tungsten carbide, cobalt, manganese dioxide, spinel type compounds, perovskite type compounds (i.e. mixed metal oxides having of the formula $ABO_3$ in which A and B are cations of two different metals and in which the A cation is coordinated to twelve oxygen atoms while the B cation occupies octahedral sites and is coordinated to six oxygen atoms), carbon based particles such as carbon black combined with platinum, palladium and silver. Mixtures of the various catalysts set out above can also be used.

The concentration of the binder in the printable composition of the invention is preferably not less than 1%, e.g., from 1% to 30% (w/w). The binder which is combined with the catalyst particles to form the printable composition may be hydrophobic, and may serve several useful purposes. The binder enables the formation of a uniform composition having paste-like consistency. The binder may be hydrophobic, such that it contributes to the attachment of the PTFE sheet which forms part of the electrode assembly of the invention. The binder may also contribute to the hydrophobic character of the electrochemically reactive zone, which consists of the solid catalyst (e.g. silver particles), the alkaline electrolyte and air. Suitable binders include fluorinated polymers and copolymers, e.g., fluorinated ethylene propylene copolymer (abbreviated herein "FEP"), which is a copolymer of hexafluoropropylene and tetrafluoroethylene and is hence compatible with the PTFE separator applied.

Other suitable binders include PVDF (polyvinyl difluoride), PFA (perfluoroalkoxy), THV (a copolymer of tetrafluoroethylene, hexafluoropropylene and vinylidene fluoride), polyethylene such as coathylene or chlorotrifluoroethylene.

The printable composition also comprises a liquid carrier which preferably consists of an aqueous alcohol, e.g., a mixture of water and ethanol, or water and isopropanol. Preferably, the water and alcohol are used in approximately equal volumes.

The printable composition is prepared by combining together the catalyst, the binder and the liquid carrier. To this end, the binder is conveniently applied in the form of an aqueous dispersion which is first mixed with the catalyst, followed by the addition of water and alcohol and the vigorous stirring of the resultant composition until a paste is formed. The mixing may be intermittently interrupted, allowing the composition to stand for not more than 60 minutes following each interruption.

It should be noted that one or more additional ingredients may be present in the printable composition, such as an electronically conductive powder, e.g., carbon, graphite, nickel, nickel coated carbon, tungsten carbide, or oxide or nitride of titanium. In general, the weight concentration of said additive(s) in the printable composition is from 0% to 80%.

The amount of the printable composition per unit area of the current collector is preferably from 10 mg/cm$^2$ to 150 mg/cm$^2$.

Turning back to FIG. 4, tray (25), in the form of a relatively thick hydrophobic support sheet (e.g., polypropylene, polyethylene, silicon or a thick PTFE sheet), current collector (23) and a stainless steel stencil whose thickness is from about 50 microns to 1 mm are placed one on top of the other on the working surface of a printing machine. The printable composition is then applied onto the surface of the stainless steel stencil, following which the stencil is removed and a suitable cover is placed above the current collector. Catalyst compaction is then accomplished in a press. For this purpose, the structure, consisting of the mechanical tray, the current collector loaded with the electrode particles and the cover, is transferred to a press in which 0.5-35 ton pressure is applied, turning the electrode particles into a compressed mass embedded within the central region of the current collector. The cover is then peeled off the catalyst-loaded current collector, which in turn is separated from the mechanical tray (e.g., from the polypropylene sheet). The resultant element consists of the current collector with catalyst particles affixed within its central region.

It should be noted that the stage set out above consists of several steps (e.g., assembling the mechanical tray and the current collector, followed by the printing of the catalyst formulation), and the order of these steps may be reversed. For example, the catalyst composition (26) is printed directly onto the surface of the mechanical tray (e.g., onto a polypropylene sheet (25)). The current collector (23) is then placed on the printed region, such that the sides of the conductive metal frame (22) are aligned with the sides of said printed region. The current collector is then pressed against the catalyst printed region whereby the catalyst penetrates into the pores of the current collector. The temporary polyethylene sheet tray is then detached from the electrode and excess electrolyte is removed.

An important feature of the invention resides in that the printable composition is not applied over the entire central region of the current collector. At the printing stage, a narrow gap of about 1-7 mm is left between the perimeter of the current collector and the boundary of the region filled with the active material using appropriate masking.

The operations set forth above, namely, catalyst introduction and compaction and hydrophobic film coupling can also carried out essentially simultaneously, such that there is no need to use a temporary removable tray. In this variant of the invention, the hydrophobic PTFE film is supported on a suitable substrate, e.g., silicon-coated substrate to which the PTFE film is weakly attached. The printable composition is applied onto the upper face of the PTFE film. The current collector is then placed on the PTFE film (it should be noted that application of the printable composition and the placement of the current collector may be carried out in a reverse order) and the resultant single-gridded cathode is pressed under the conditions set forth above.

Following compaction in the press, the electrode assembly is oven-sintered at the maximum tolerable temperature, which is about 230-360° C., preferably 230-300° C., more preferably about 250-280° C., for a period of about 5 to 30 minutes. It should be noted that the hydrophobic PTFE film does not easily withstand the conditions encountered at the sintering stage, and it tends to detach from the current collector. The attachment of the PTFE film onto the face of the current collector may be facilitated mechanically, e.g., using releasable fastening means, e.g., simple clips which hold the PTFE film to the perimeter of the electrode assembly or chemically, by increasing the amount of the binder present in the printable composition used in forming the electrode. In particular, the use of FEP as a binder in the printable composition allows a relatively low workable sintering temperature.

According to the variants of the inventions set forth above, a commercially available hydrophobic film was attached to the electrode to form the electrode assembly. However, in some cases it may be advantageous to form in-situ a hydrophobic coating onto the electrode, in lieu of using a film, for example, when the commercially available film is found to exhibit a high shrinkage rate or when improved contact between the catalyst layer and the hydrophobic layer is desired. Relevant techniques are described in WO 2014/057483.

The electrode comprises a catalyst for promoting oxygen reduction, which catalyst preferably consists of silver associated with zirconium oxide, as set out above, and a binder, which is preferably FEP, wherein the weight ratio between the catalyst and the binder is preferably not less than 6:1. For example, the catalytically active composition contains a binder in an amount between 4 and 15%, more preferably 5 and 14% and even more preferably 5 and 13% (w/w).

Figure 5:
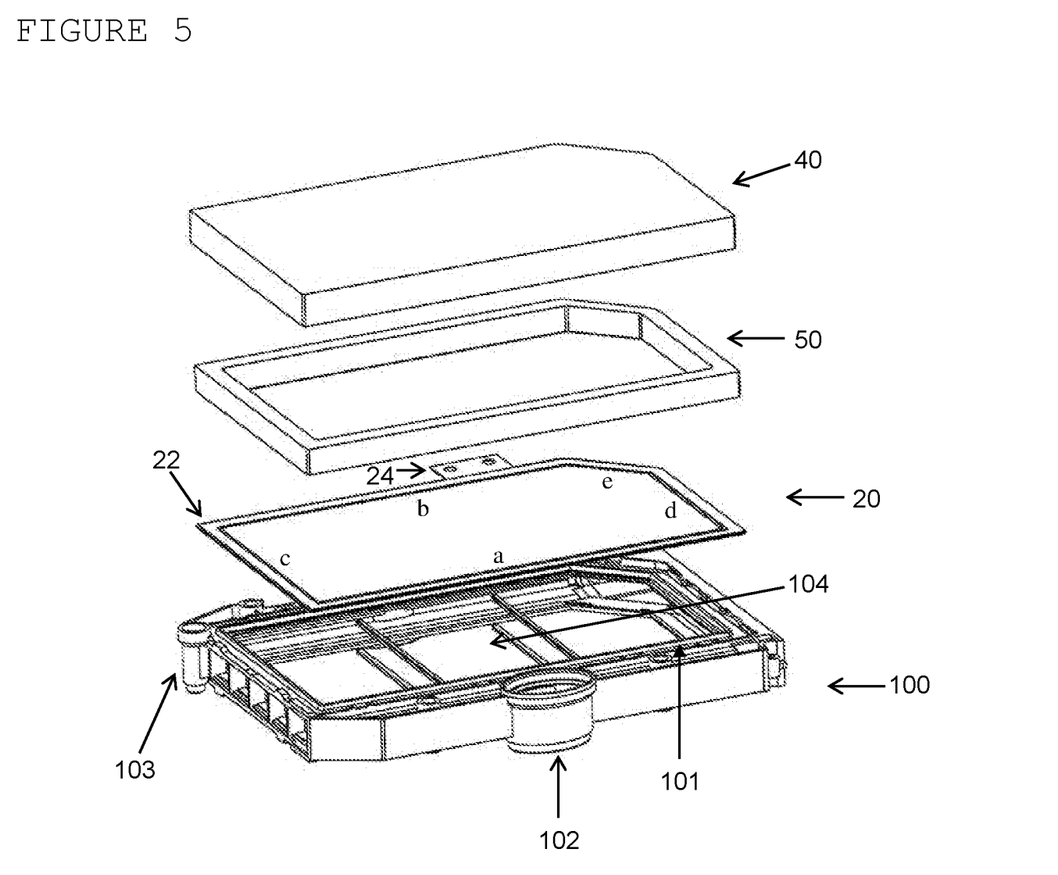
FIG. 5 is a high-level schematic illustration of a frame of an individual cell in the battery, according to some embodiments of the invention.

Turning now to FIG. 5, it provides a schematic isomeric view of the key elements taking part in the last step of the process, namely, the step of joining the air cathode (20) to the cell frame (100) by incorporating molten thermoplastic into the pores in the catalyst-free area of the air cathode with the aid of a press (40) and hot shoe (50).

In the specific embodiment shown in FIG. 5, the geometrical shape of the air cathode slightly differs from that of the rectangular that was previously shown in FIG. 4. The opposite parallel sides are not (mutually) equal; the shape of the air cathodes is hence of a pentagon (though not equilateral). Another difference is that a full current collector frame 22 surrounds the air cathode. Note that the catalytically active surface of air cathode (20) is not shown in FIG. 5, because it faces cell frame (100) which is placed below the air cathode from the position of press (40).

Cell frame (100) is made of a thermoplastic such as polypropylene, including grades enforced with carbon or glass fibers. Other suitable thermoplastics that can withstand hot alkaline electrolyte and elevated working temperatures encountered during operation of metal-air batteries include polyethylene, FEP, FPA, blends of polyphenylene ether resin and polystyrene (available as Noryl™ from Sabic) and polyvinyl chloride (PVC).

The design of the cell frame (100) is fairly conventional with the exception that it is characterized by the presence of a raised region (101) which is identical in geometrical shape to the catalyst-free margin area of the PTFE film. As mentioned above, frame (100) is usually molded as one-piece, e.g., by injection molding. The major conventional parts shown in FIG. 5 include electrolyte entrance (102) to supply the electrolyte into the cell chamber; the diameter of the cylindrical passage (102) is ~30-40 mm; a connector (103) located at one corner of the cell frame; anode entrance (104), that is, for introducing the consumable aluminum anode in the middle of the chamber defined by cell frame (100). It should be noted that usually an array consisting of a pair of cathode assemblies (20) is used, one positioned on the upper face of cell frame (100) as shown in FIG. 5, and the other covering the bottom of the cell frame (not shown), with an aluminum anode interposed in the space between the pair of cathodes; in this case, each of the opposing sides of the cell frame (100) includes a raised region (101), to enable the welding of a cathode (20) on each side. Aa mentioned above, frame (100) is usually molded as one piece, e.g., by injection molding but the frame (100) and raised region (101) may exhibit different melt flowability; that is, the melt flow index (MFI) of the polypropylene grade of which the body of frame (100) is made is from 10 to 20 g/10 min (ASTM D1238 at 230° C./2.16 kg) whereas the MFI of the polypropylene (101) that is forced to penetrate into the PTFE porosity may be greater, for example, above 30 g/10 min, or above 40 g/10 min, or above 50 g/10 min.

The cathode assembly (20) is placed upon the plastic frame (100) such that the catalyst-free area (27) on the PTFE coincides in position with an out jutting rim of thermoplastic defining the raised region (101). Plastic rim (101) is of 3-5 mm in width while the surface of the exposed PTFE, that is, the catalyst-free area (27), is slightly larger, preferably 4-8 mm in width. The height of the rim is from 1-3 mm.

The cathode is placed in a hot press with a mold (50) (hot shoe made of aluminum) corresponding in geometrical shape and dimensions to raised region (101). Hence the width of each side of mold (50) is equal to, or slightly less than, the width of the exposed, catalyst-free area. Shoe Mold (50) is preferably made of aluminum. The temperature of the hot shoe is higher than the melting temperature of the plastic frame (e.g., in the case of PP the preferred temperature range of the hot shoe may be 140° C.-280° C.). As mentioned above, the catalyst side of the electrode faces the frame while the PTFE side is exposed towards the press. A heat release liner may be used to prevent the hot shoe from sticking to the PTFE film. A preferable choice is a 0.15 mm impregnated glass cloth of PTFE.

Press (40) is activated, and heated mold (50) is pressed against the electrode. The press pressure may be controlled as well as the compression distance to build up weld head pressure while allowing the press head to propagate as the plastic rim thermoplastic melts. The preferred pressures are usually from 1 to 100 kg/cm$^2$. The flow of the thermoplastic is directly related to the type of thermoplastic being used, the welding head temperature and the applied pressure. By building up the pressure correctly the flow of the thermoplastic is in the direction of the PTFE film. It may be preferable to put stoppers within the weld area to eliminate propagation of the weld head beyond a certain distance. Weld times usually are between several seconds to a minute or two.

Heat welding systems for use instead of a direct heat welding include ultrasonic welding, radio wave welding, impulse welding, induction welding, solvent welding or laser welding.

During the welding process the thermoplastic melts and flows through the mesh or the expanded metal (i.e., current collector 23 in FIG. 4; not shown in FIG. 5, since it faces frame 100) and fills the PTFE pores to a certain extent in the catalyst-free area 27. The flow of the molten thermoplastic into the PTFE pores and its solidification joins the PTFE film and the thermoplastic together. It is seen that on tearing off the PTFE film from the thermoplastic rim, residue of PTFE remains on the rim, indicating good adhesion of the PTFE to the thermoplastic rim. The thermoplastic may contain conventional additives, e.g., mechanical property modifiers, processing modifiers, etc.

During the weld process the weld shoe footprint is quite thin (typically several mm's). It is often recommended to eliminate heat flow to active electrode area. The heat which flows into the active area of the electrode may damage the catalyst and cause oxidation of the catalyst or delamination of the PTFE film from the active electrode. We have found that it is advantageous to place a heat sink above the active area of the electrode to absorb excess heat which flows from the hot shoe through the catalyst. The simplest method may be a pad soaked with water; but the preferred method is a metallic heat sink with a cooling low temperature liquid running through the metal to ensure low temperature and efficient heat absorbance.

As an alternative to the method shown in FIG. 5 (based on a raised thermoplastic region (rim 101) which forms an integral part of the molded plastic cell frame (100)), one may consider a precut polypropylene piece which corresponds in shape and size to rim (101). This piece can be positioned between a conventional cell frame (100) and cathode assembly (20); under application of heat and pressure as described above the same effect of flow and penetration of molten polypropylene into the porosity of the PTFE film would be achieved.

The electrodes produced in this fashion have been exposed to 30% potassium hydroxide solutions at 80° C. in closed circuits. Pressures of the system are changed arbitrarily between 50 mbar to 300 mbar. Leaks from weld lines are tracked by appearance of electrolyte flow from the cells. Over 300 work hours of these electrodes have been achieved without any sign of leak.

Figure 6:
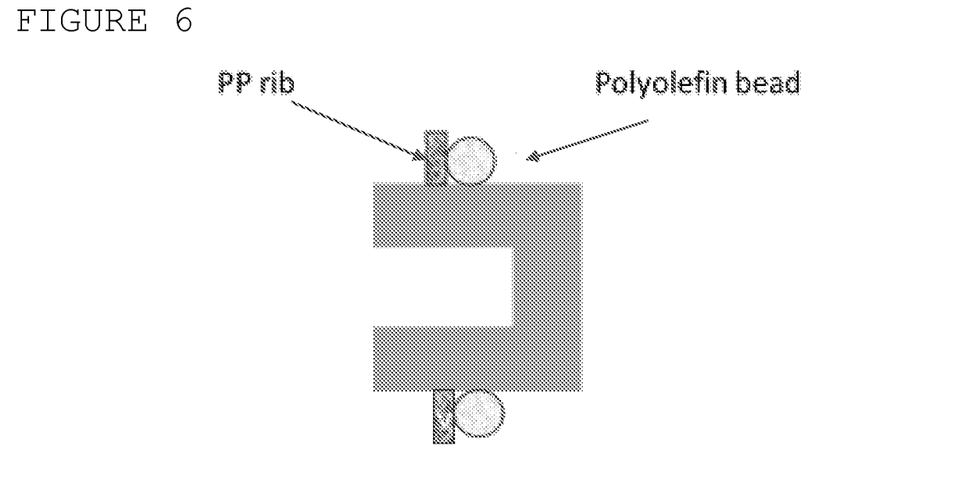
FIG. 6 is a high-level schematic cross-section illustration of a combination of a chief thermoplastic and hot melt polyolefin, according to some embodiments of the invention.

FIG. 6 illustrates the use of a combination consisting of a chief thermoplastic (i.e., a raised polypropylene region; indicated PP rib in FIG. 6) and hot melt polyolefin (preferably in the form of beads; indicated polyolefin bead) for the welding of the air cathode to the cell frame. FIG. 6 shows a cross section of the cell frame; it is seen that each of the opposing sides of the cell frame includes the combination of the raised polypropylene region and the hot melt polyolefin, to enable the welding of a cathode on each side, as explained above. The hot melt polyolefin is applied such that it encircles the raised polypropylene region, for example, to create ~1 mm wide, 1 mm high perimeter encircling the raised polypropylene region. The polyolefin of choice is a polyolefin bonding adhesive, one that bonds well to polypropylene. It should not liquify at the maximal operating temperature of the battery, say, up to 80° C. The polyolefin bead is injectable at temperatures above 160° C., e.g., above 180° C. Suitable hot melt polyolefin in the form of beads are available in the market, for example, 3M™ Polyolefin Bonding Adhesive 3731.

EXAMPLES

Preparation 1

Printable Catalyst Formulation

Silver catalyst (70 grams; prepared as described in U.S. Pat. No. 8,142,938) is mixed with 10 grams of FEP (available from Dupont in the form of aqueous dispersion, TE-9568). The mixture is placed in a rotating shaker for 1 hour. Water (20 grams) and isopropanol (20 grams) are then added to the mixture and the shaker is allowed to rotate for an additional period of 25 minutes. The resultant composition is allowed to stand for 1 hr and is then remixed for 25 minutes. The resultant composition exhibits good flowability and thixotropicity and is suitable for use as a printable material.

Preparation 2

Printable Catalyst Formulation

Silver catalyst (70 grams; prepared as described in U.S. Pat. No. 8,142,938) and 70 grams of nickel-coated carbon particles (60% w/w, such as E-2701 or E-2702 commercially available from Sulzer) are mixed with 14 grams of FEP (available from Dupont in the form of aqueous dispersion, TE-9568). The mixture is placed in a rotating shaker for 1 hr. Water (40 grams) and ethanol (40 grams) are then added to the mixture and the shaker is allowed to rotate for additional 25 minutes. The resultant composition is allowed to stand for 1 hour and is then remixed for 25 minutes. The composition thus formed exhibits good flowability and thixotropicity and is suitable for use as a printable material.

Example 1

Air Electrode Assembly with a Thermoplastic Applied onto the Margin Area of the PTFE Film Preparation of the current collector: Nickel mesh (commercially available from Haver & Bocker (nickel 99.2 Nickel wire, 34 mesh, wire thickness 250 µM, calendered to 0.23 mm thickness) is cut with a guillotine knife to form a pentagon-shaped mesh (the shape is shown in FIG. 5; a=22.5 cm, b=18.5 cm, c=13.5 cm, d=10.0 cm and e=5.0 cm). The resultant mesh is thoroughly cleaned with ethanol and metallic particles are blown off from the mesh using air pressure.

A 500 µm thick copper sheet is cut to form a pentagon shaped frame (element 22 in FIG. 5). An electrical conducting tab 24 (2.5 cm×3 cm) is attached to one side of the copper piece. The copper piece is then plated with nickel by means of electroless nickel plating, thereby forming a nickel coating which is about 20 microns thick.

The nickel-coated copper pentagon-shaped frame 22 is then welded to the edge of the nickel mesh by means of point (resistance) welding.

Preparation of the electrode: The catalyst formulation (see Preparations) is applied on the current collector as follows. A 200-300 µm thick polypropylene sheet, the current collector and a ~500 µm stainless steel stencil with a suitably sized cavity (to enable the formation of a catalyst-free margin area) are placed on a printing machine (Ami Presco model MSP-9155) one on top of the other, such that the polypropylene sheet and the stainless steel stencil constitute the lowermost and uppermost layers, respectively. The catalyst formulation is then applied using a blade or squeegee which is passed above the stencil such that the silver catalyst formulation penetrates through the stencil into the pores of the current collector mesh. The stainless steel stencil is then removed, and 10 sheets of standard A4 paper are placed above the current collector and the stack is transferred to a press in which a 10 ton pressure is applied. The papers are carefully peeled off the electrode and the electrode is then detached from the polypropylene sheet.

Electrode assembly: the electrode and the hydrophobic film are combined as follows. The outer perimeter of the Haber & Bocker mesh are coated with an aqueous form of FEP such as TE9568 or FEPD121 produced by DuPont via a thin paint brush and the emulsion is allowed to dry for 10 minutes. A porous hydrophobic PTFE film (manufactured by Saint Gobain or Gore) which is slightly larger than the electrode is placed above the electrode and a pressure of 10 tons is applied using a press. The electrode assembly is then oven-sintered at about 280° C. for a period of about 20 minutes. In order to prevent the membrane from shrinking or detaching from the mesh a heavy external metallic frame that coincides with the external area of the current collector is placed on the mesh and membrane thus reducing membrane detachment during the 280° C. sintering process.

The electrode is allowed to cool to room temperature prior to welding to the cell frame.

Welding the Air Cathode to the Cell Frame

The set-up is shown in FIG. 5. An electrode assembly (20) with an exposed area of PTFE is placed on a thermoplastic frame of polypropylene (100). The face of the electrode assembly with the catalyst layer applied thereon faces the thermoplastic frame and hence not shown in FIG. 5; towards the outer side is the PTFE film. The frame may be filled with a plastic or metal insert such that the plastic does not buckle in when exposed to high pressure and temperature.

Above the electrode is placed a Teflon based sheet [available from AMI-TUF® (TGL) PTFE Coated Cloth of 0.012 inch thickness, to prevent adhesion of the hot shoe to the PTFE film of electrode assembly (20)]. The heat press (40) with the hot shoe (50) is heated to 260° C. and the shoe is applied with a pressure of 10-15 kg per cm². The pressure is held for 30 seconds. The heat head is lifted and a brass slab of 4 mm thickness with the exact dimensions of the electrode is placed on the electrode for a period of 1-3 minutes until electrode temperature has reached below 80° C.

Example 2

Air Electrode Assembly with a Thermoplastic Applied onto the Margin Area of the PTFE Film The procedure of Example 1 was repeated, with the exception of the last step, which was carried out as described below.

Welding the Air Cathode to the Cell Frame

The set-up is shown in FIG. 5. An electrode assembly (20) with an exposed area of PTFE is placed on a thermoplastic frame of polypropylene (100). The face of the electrode assembly with the catalyst layer applied thereon faces the thermoplastic frame and hence not shown in FIG. 5; towards the outer side is the PTFE film. The frame may be filled with a plastic or metal insert such that the plastic does not buckle in when exposed to high pressures and temperatures.

A polyolefin hot melt bead is applied onto the external circumference of the frame so that the polypropylene elevated area (101) is inwards and more outwards is a hot melt ring, as shown in FIG. 6 (the rib indicates the polypropylene wall protruding from the surface of the frame). This structure provides a combination of a stronger mechanical welding along with an additional leak proof barrier.

Above the electrode is placed a Teflon based sheet [available from AMI-TUF® (TGL) PTFE Coated Cloth of 0.012 inch thickness, to prevent adhesion of the hot shoe to the PTFE film of electrode assembly (20)]. The heat press (40) with the hot shoe (50) is heated to 260° C. and the shoe is applied with a pressure of 10-15 kg per cm². The pressure is held for 30 seconds. The heat head is lifted and a brass slab of 4 mm thickness with the exact dimensions of the electrode is placed on the electrode for a period of 1-3 minutes until electrode temperature has reached below 80° C.

The invention claimed is:

1. A method for assembling a metal/air cell, comprising the steps of:
   (i) providing an air cathode assembly that comprises hydrophobic porous film having a first face and a second face, with a current collector and catalyst-containing active layer provided on said first face, with the planar dimensions of the catalyst-containing active layer provided on said first face, with the planar dimensions of the catalyst-containing active layer provided on said first face, with the planar dimensions of the catalyst-containing active layer being smaller than that of said film and the current collector, such that the catalyst-containing active layer does not reach the edges of said film and current collector, thereby creating a catalyst-free margin on the film and current collector, which surrounds the catalyst-containing active layer;
   (ii) placing said cathode assembly atop of a cell frame defining an electrolyte chamber, with a thermoplastic body that is capable of softening to a mobile, flowable state upon heating to an elevated temperature being positioned between said cell frame and said cathode assembly,
      wherein the thermoplastic body coincides in geometrical shape and position with said catalyst-free margin area and essentially coincides also in width with said catalyst free-margin; and
   (iii) applying heat and pressure to soften the thermoplastic body and forcing a thermoplastic melt to flow in the direction of the pores in the catalyst-free margin of the hydrophobic porous film, thereby welding the air cathode assembly and the frame of the cell upon solidification of the melt,
      wherein the thermoplastic body comprises a raised region of the cell frame protruding from the surface of the frame, said raised region forming an integral part of the frame.

2. The method according to claim 1, which comprises a step of applying hot melt polyolefin onto the surface of the cell frame adjacent to, and in outward direction from, the raised region of the cell frame.

3. The method according to claim 1, wherein the thermoplastic body is polypropylene body.

4. The method according to claim 1, wherein the thermoplastic body softens at a temperature in the range from 120 to 280° C.

5. The method according to claim 1, wherein the air cathode and the frame of the cell are welded by coating of the current collector with the molten thermoplastic and/or by penetration of the molten thermoplastic into the pores of the hydrophobic film in the catalyst-free margin.

6. The method according to claim 1, wherein the hydrophobic film is PTFE film.

* * * * *